Aug. 29, 1933.  T. G. BLOSE  1,924,975
ENGINE TESTER
Filed Oct. 27, 1931  2 Sheets-Sheet 1
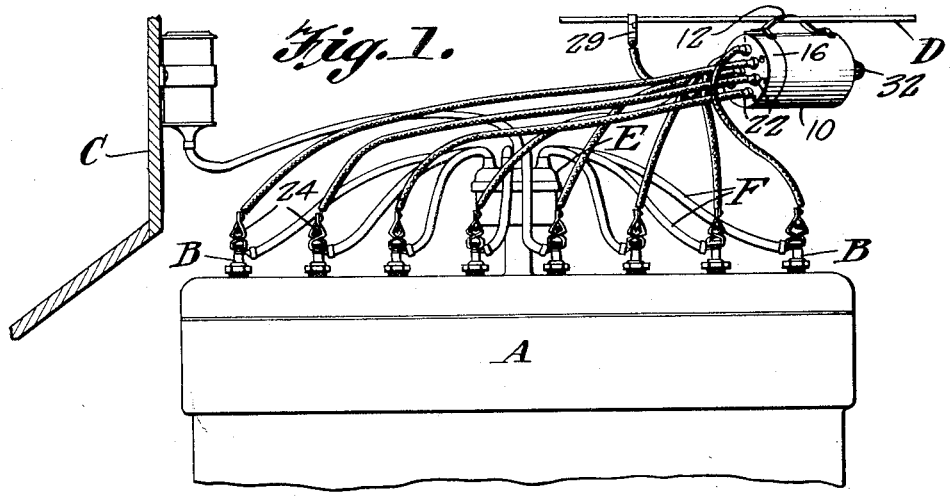
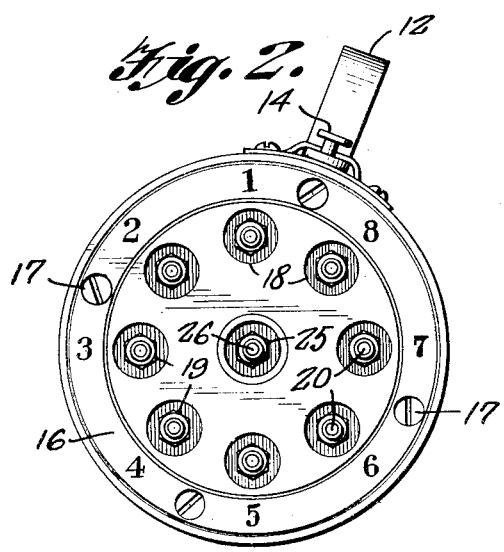
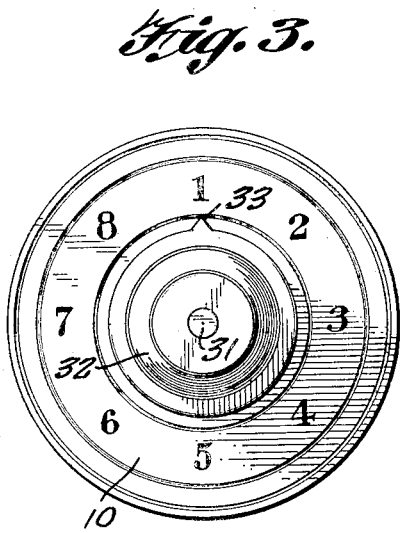
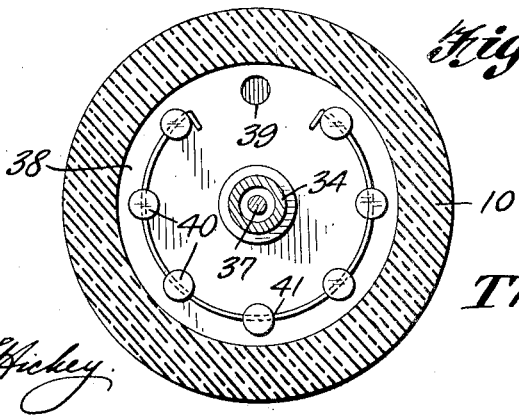
Thomas G. Blose, INVENTOR
BY Victor J. Evans & Co.
ATTORNEY
WITNESS: P. J. Hickey Aug. 29, 1933.                T. G. BLOSE                 1,924,975
                             ENGINE TESTER
                       Filed Oct. 27, 1931        2 Sheets-Sheet 2
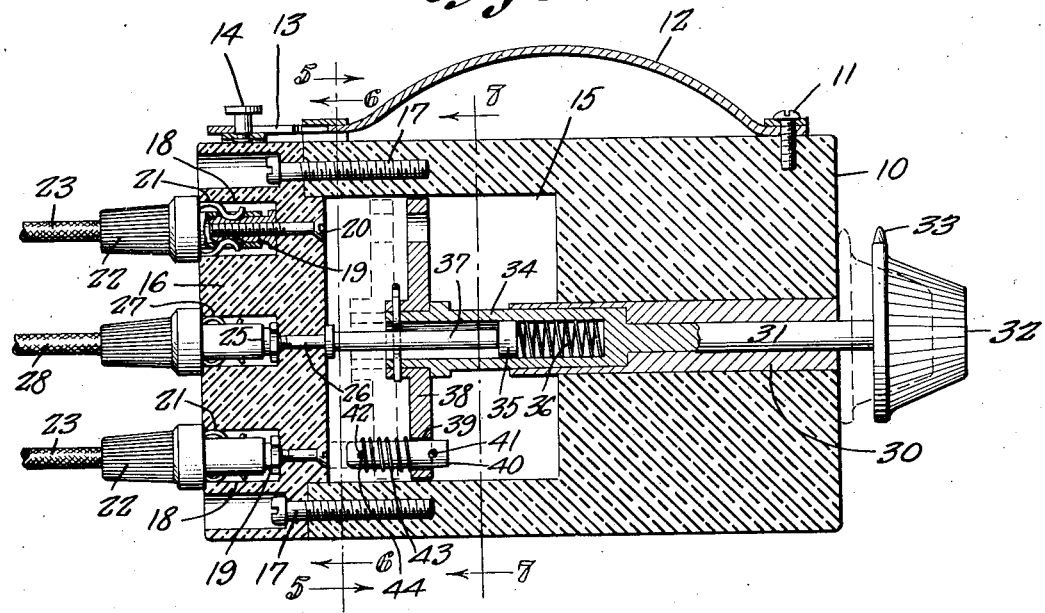
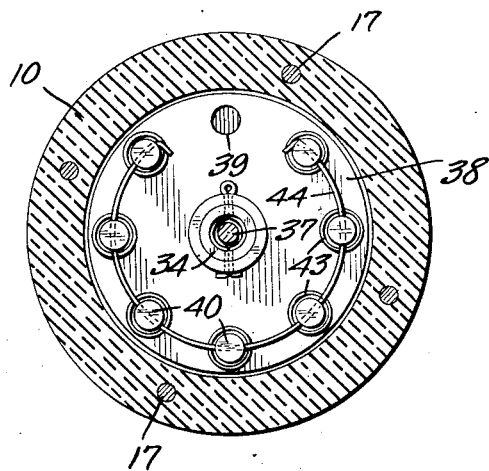
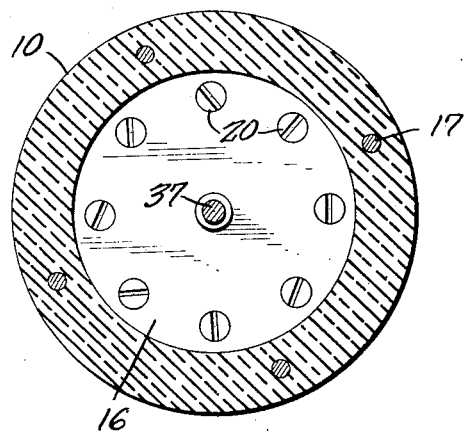
Thomas G. Blose,
INVENTOR
BY Victor J. Evans & Co.
ATTORNEY
WITNESS:

Patented Aug. 29, 1933

1,924,975

UNITED STATES PATENT OFFICE 1,924,975

ENGINE TESTER

Thomas George Blose, Coplay, Pa.

Application October 27, 1931. Serial No. 571,472

5 Claims. (Cl. 175—183)

The invention relates to an electrical apparatus, particularly such for testing purposes, and has for its general object the provision of a novel device adapted to be connected with the spark plugs of an automobile or other internal combustion engine and operable to give information regarding the action of the sparks within the cylinders so that a defective spark in any cylinder can be readily ascertained, thus apprising the user of the fact that a spark plug may be fouled, may have a cracked porcelain or be otherwise defective.

A very important object of the invention is to provide a testing device of this character adapted to be connected with the spark plugs of an engine without detaching the feed wires thereto, the device being moreover equipped with means whereby it may be suspended from the stay rod which extends between the dash and the radiator so that its use may be made extraordinarily simple and most convenient.

A further object of the invention is to provide a testing device of this character embodying means whereby all of the spark plugs with the exception of any selected one may be grounded so that only one cylinder will be permitted to fire, thereby enabling the operator to ascertain definitely just which cylinder is defective, it being known that such a test will disclose not only a faulty spark plug but also which particular cylinder may have a knock in it.

Yet another object of the invention is to provide a testing device embodying a rotary knob having a pointer cooperating with numerals corresponding to and indicating the successive cylinders and spark plugs therein so that the operator will know without any doubt whatsoever just exactly which cylinder is being tested.

An additional object is to provide a testing device of this character which will be simple and inexpensive to make, easy to use, positive and accurate in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which Figure 1 is a fragmentary view through the front part of an automobile showing a portion of the engine, the dash in section and a fragment of the stay rod for the radiator.

Figure 2 is an elevation of one end of the testing device.

Figure 3 is an elevation of the other end.

Figure 4 is a longitudinal section.

Figure 5 is a cross section taken on the line 5—5 of Figure 4.

Figure 6 is a cross section taken on the line 6—6 of Figure 4.

Figure 7 is another cross section taken on the line 7—7 of Figure 4.

Referring more particularly to the drawings, the letter A designates a portion of an automobile engine or the like, B represents the spark plugs in the various cylinders thereof, C designates the dash of the vehicle and D the radiator stay rod. It will be observed that the distributor is shown and designated at E and connected by wires F with the respective spark plugs B.

In carrying out my invention I provide a testing device comprising a preferably cylindrical body 10 of some suitable insulating material to which may be secured at one end as shown at 11 a strap or other suspension device 12 adapted for instance to be engaged over the stay rod D for the purpose of mounting the device temporarily adjacent the engine to be tested. The other end of the strap or suspension device 12 is slotted as at 13 and detachably engaged upon a headed stud 14. Obviously any other equivalent means might be provided for suspending the tester in a convenient location but the present arrangement is very satisfactory.

One end of the body 10 is formed with a chamber 15 normally closed by a disk 16 likewise of insulating material held in place as for example by means of screws 17 or their equivalent. Carried by the disk 16 and located preferably within recesses 18 therein are stud like terminals 19 arranged in circular series and secured in place as by screws 20. Detachably engaged upon these stud terminals or contacts are terminal clips 21 carried by sleeves 22 and connected with conductors 23 in turn provided with spring or other clips 24 by means of which they may be engaged upon the terminals of the respective spark plugs B to be tested. The outside face of the disk 16 is inscribed with a series of numerals, as shown in Figure 2, located adjacent the terminals 19 so as to indicate the proper connection of the conductors 23 with the spark plugs B.

Located at the center of the disk 16 is a contact 25 similar to the contacts or terminals 19 and held in place by a screw 26 and adapted to be engaged by a terminal clip 27 with which is connected a conductor 28 equipped with a clip 29 or the like adapted to be grounded at some convenient location, for example upon the stay rod D.

Mounted axially through the body 10 is a metal sleeve 30 through which is journalled a metal rod or spindle 31 which is also longitudinally movable and which carries a knob 32 located exteriorly at the other end of the body 10 and equipped with a pointer 33 adapted to be brought opposite a series of numerals as shown in Figure 3 corresponding to the numerals on the other end of the body or disk 16 as shown in Figure 2. Within the sleeves 30 the stem 31 carries an enlarged chambered portion 34 within which is slidable a disk 35 urged toward the disk 16 by a spring 36 and engaged with a stem or plunger 37 engaging the screw 26 or formed as a part of the screw 26, this detail being immaterial. Carried by the inner end of the enlarged portion 34 of the stem 31 is a metal disk 38 formed with holes 39 through which extend slidable contacts 40 having transverse stop pins 41 and 42 extending therethrough, the latter serving as abutments for coil springs 43 which also abut against the disk 38 and which operate to urge the contacts 40 toward the disk 16. All of the contacts 40, which are less in number by one than the contacts 19, are connected for example as by a wire or other conductor 44.

It is of course to be understood that the stem 31 being in electrical connection with the screw 26, contact 25, clip 27 and the conductor 28 as well as the clip 29 with the stay rod D provides a ground. Moreover as the disk 38 is of metal and is carried by the enlarged end 34 of the stem 31 it and consequently the spring pressed contacts 40 will also be grounded at all times. However, under normal circumstances the spring 36 reacting against the stem and the disk 35 acts to hold the stem 31 in its outwardly extended position so that the disk 38 will be in such position that the contacts 40 will be out of engagement with the screws 20 though the stem 31 is always in electrical connection with the ground.

In the operation of the device, it is of course necessary that the tester be mounted at some convenient position with respect to the engine A. The conductors 23 connected with the series of terminals 19 on the tester are connected with the respective spark plugs B to be tested without disconnecting the spark plugs or the wires F thereof from the distributor, everything being left in normal condition. The clip 29 must be grounded as for example by being engaged upon the stay rod D which is very convenient for the purpose. Assuming that the operator then intends to test number 1 cylinder, he grasps the knob 32 and turns it so as to bring the indicator or pointer 33 opposite the numeral 1 at the adjacent end of the body 10 as shown in Figure 3. The operator then, while the engine is running, presses the knob 32 inwardly whereupon the metal disk 38 is correspondingly moved and brings the spring pressed contacts 40 into engagement with the screws 20. However there is no contact 40 opposite the screw 20 to which is connected the conductor 23 leading to cylinder number 1. As all of the contacts 40 are connected by the wire 44 it is apparent that when the contacts 40 are thus brought into engagement with all of the contact screws 20 except one, all of the spark plugs with the exception of the spark plug in cylinder number 1 will be grounded and will not fire. The engine then runs on one cylinder and if there is any miss or irregular action the operator will know at once that this spark plug in cylinder number 1 is defective. For testing the other cylinders, the knob 32 is turned so as to bring the pointer 33 into registration or alinement with the numerals 2, 3, 4, 5, 6, 7, 8, or as many as may be provided, it being necessary to press the knob 32 inwardly toward the body at each of the successive positions so as to test the spark plugs of cylinders 2, 3, 4, 5, 6, 7, and 8 in succession. In this way it is apparent that the motor will operate or be caused to run on each single cylinder in succession, thereby making it easily possible for the operator to ascertain just exactly how the different spark plugs are operating. Furthermore it is known that knocks in the different cylinders can be detected by short circuiting or grounding the plugs therein and the tester is therefore particularly advantageous in carrying out this function.

From the foregoing description and a study of the drawings, it is believed that the construction, operation and advantages will be readily apparent to one skilled in the art without further explanation.

While I have shown and described the preferred embodiment of the invention, it should be understood that I reserve the right to make all such changes in the details of construction as well as in the arrangement and combination of parts as will not depart from the spirit of the invention or the scope of the subjoined claims.

Having thus described the invention I claim.

1. An engine tester comprising a body of insulating material having a chamber therein, a disk on one end of the body closing said chamber, a central contact carried by said disk and adapted to be grounded, a circular series of contacts carried by said disk and adapted to be connected with the successive spark plugs of an engine to be tested, a stem of metal slidable and rotatable axially through said body and carrying a knob exteriorly thereof, spring pressed plunger means carried by the stem in electrical connection therewith and always engaging said central contact, a metallic disk carried by the stem, and a series of contacts carried by said metal disk and adapted to be engaged selectively with all but one of said circular series of contacts.

2. An engine tester of the character described comprising a body of insulating material formed with a chamber, a central contact carried by one end wall of said chamber and adapted to be grounded, a circular series of contacts carried by said end wall adapted to be connected with the successive spark plugs of an engine to be tested, a stem slidable and rotatable axially through said body and equipped exteriorly thereof with a knob, spring pressed plunger means carried by said stem always engaging said central contact, a member carried by said stem within the chamber and a plurality of spring contacts carried by said member and electrically connected with the ground and adapted to be engaged with all but a selected one of said circular series of contacts.

3. An engine tester of the character described comprising a body of insulating material formed with a chamber, a central contact carried by one end wall of said chamber and adapted to be grounded, a circular series of contacts carried by said end wall adapted to be connected with the successive spark plugs of an engine to be tested, a stem slidable and rotatable axially through said body and equipped exteriorly thereof with a knob, spring pressed plunger means carried by said stem always engaging said central contact, a metallic member in said chamber carried by the stem in electrical connection therewith and a plurality of spring pressed contacts carried by said member and consequently electrically connected with the ground and adapted to be engaged with all but a selected one of said circular series of contacts, both ends of the body being provided with series of numerals corresponding to the respective spark plugs and said knob having a pointer adapted to cooperate with the numerals on the adjacent end of the body.

4. An engine tester of the character described comprising a body of insulating material formed with a chamber, a central contact carried by one end wall of said chamber and adapted to be grounded, a circular series of contacts carried by said end wall adapted to be connected with the successive spark plugs of an engine to be tested, a stem slidable and rotatable axially through said body and equipped exteriorly thereof with a knob, spring pressed plunger means carried by said stem always engaging said central contact, a conducting support carried by the stem, and a plurality of spring pressed contacts carried by said support and movable with said stem and electrically connected with the central contact through said stem and plunger means and adapted to be engaged with all but a selected one of said circular series of contacts, and means carried by said body adapted for suspending it adjacent the engine to be tested.

5. An engine tester of the character described comprising a body of insulating material, a central contact carried by said body and adapted to be grounded, a circular series of contacts carried by the body adapted to be connected with the successive spark plugs of an engine to be tested, a stem slidable and rotatable axially with respect to said body and equipped with a knob, spring pressed plunger means carried by said stem always engaging said central contact, a conducting support mounted on the stem, and a plurality of contacts carried by said support and electrically connected therethrough and through the stem with the central contact and adapted to be engaged with all but a selected one of said circular series of contacts, and means for determining the numbers of the spark plugs to be tested.

THOMAS GEORGE BLOSE.